P. H. TERRY.
METHOD OF MAKING MOVING PICTURE FILMS.
APPLICATION FILED MAR. 31, 1915. RENEWED JUNE 29, 1917.
1,261,648.
Patented Apr. 2, 1918.
2 SHEETS—SHEET 1.
Fig.1,
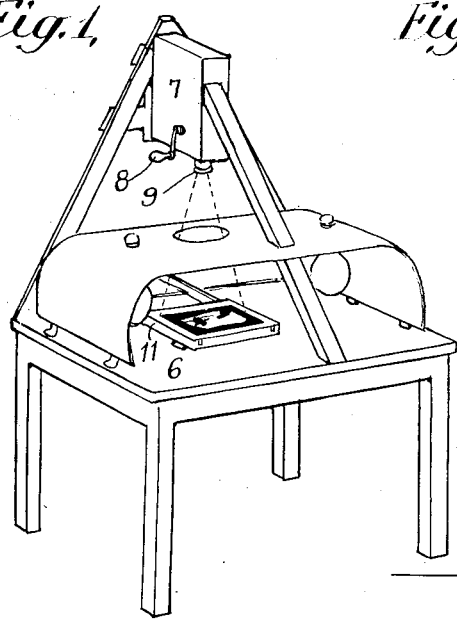
Fig.2,
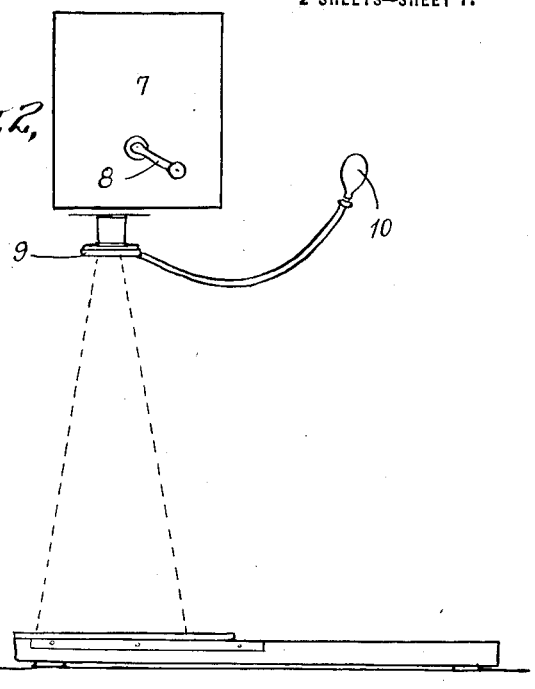
Fig.3,
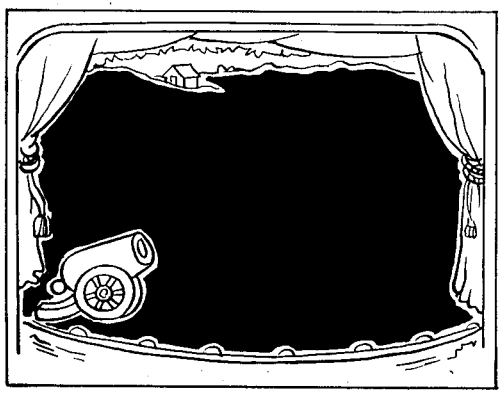
Fig.4,
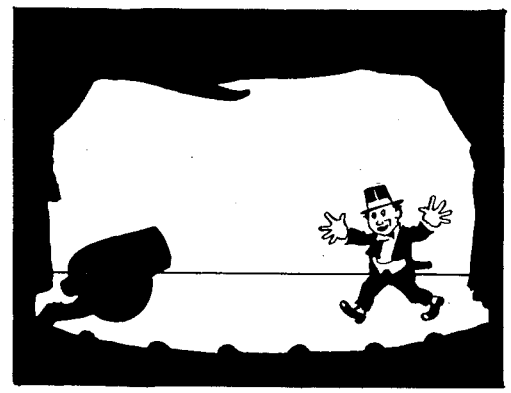
INVENTOR,
Paul H. Terry
BY
ATTORNEYS

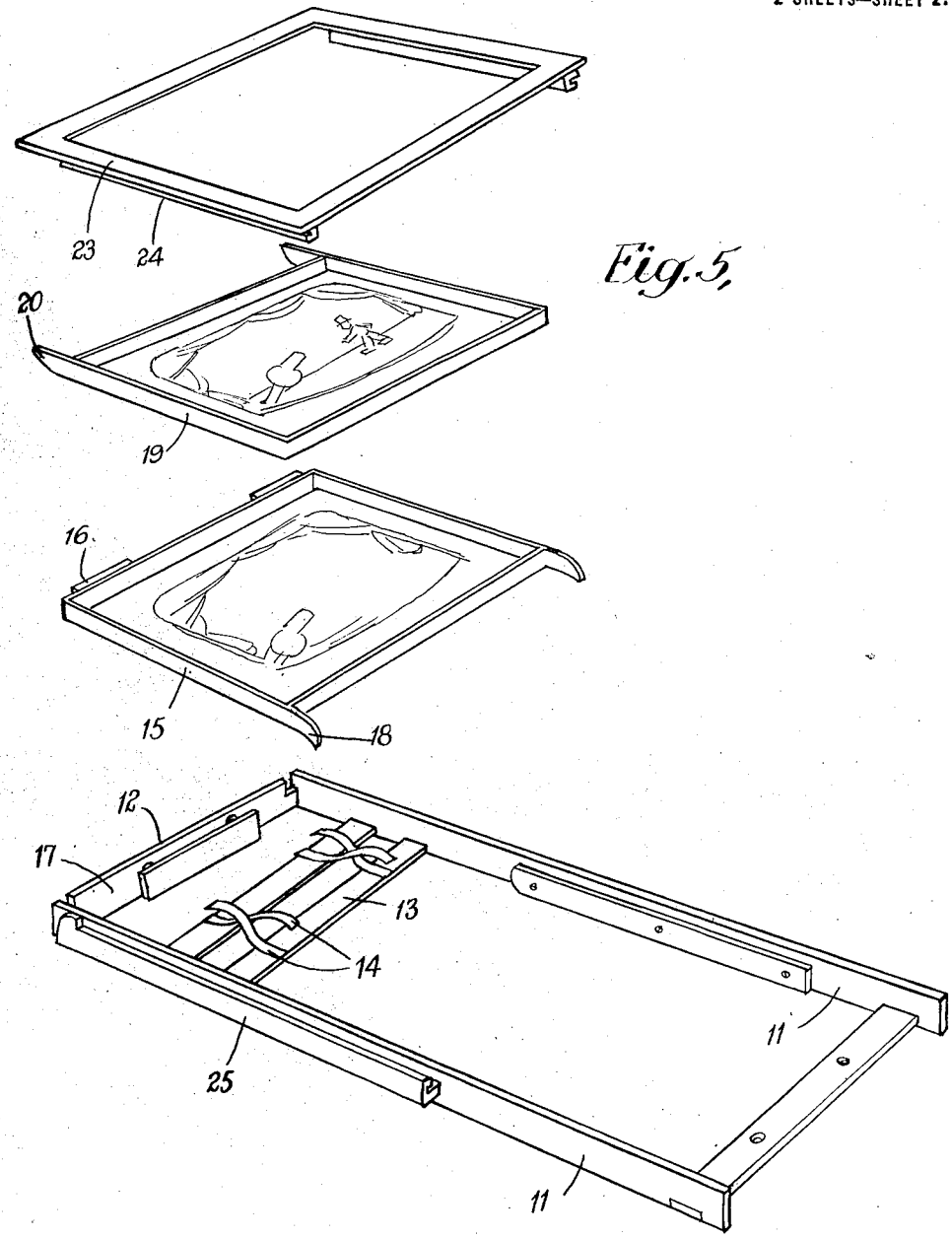

UNITED STATES PATENT OFFICE.

PAUL H. TERRY, OF NEW YORK, N. Y.

METHOD OF MAKING MOVING-PICTURE FILMS.

1,261,648.   Specification of Letters Patent.   Patented Apr. 2, 1918.

Application filed March 31, 1915, Serial No. 18,299. Renewed June 29, 1917. Serial No. 177,801.

*To all whom it may concern:*

Be it known that I, PAUL H. TERRY, a citizen of the United States, residing in the city, county, and State of New York, have invented certain new and useful Improvements in Methods of Making Moving-Picture Films; and I do hereby declare the following to be a full, clear, and exact description of the invention, such as will enable others skilled in the art to which it appertains to make and use the same.

This invention relates to the art of moving pictures and, more specifically, to the art of making films for the projection of motion pictures showing imaginary scenes and subjects, as distinguished from pictures depicting the actual movements of real persons or things. The object of the invention is to provide an improved method of making such films whereby the work incident to the production of a film is greatly simplified, whereby the time consumed in making a film and consequently the cost of the film are greatly reduced and whereby films may be made with which reproductions of a high quality may be obtained.

In a series of views suitable for the reproduction of motion pictures of imaginary scenes and subjects, many of the elements of the scene depicted appear in the same relation upon all of the individual pictures or upon all of a series of them. These portions of the pictures of a series which remain the same throughout the series and which may be termed the stationary elements of the pictures are, in accordance with my improved process, reproduced by photography for all of the series of pictures from a single representation of them. In this way, a great saving in time and labor is effected over making these portions of the several pictures individually by hand. Furthermore, the portions of the pictures showing the persons or objects which are to have the appearance of motion in the reproduction of the series of pictures are added to the representations of the stationary elements by photography, the representations of the moving elements being combined with the representations of the stationary elements preferably by successively photographing a representation of the stationary elements and a representation of the movable elements upon the same sensitized surface with the two in accurate registry.

In the employment of my invention in accordance with the preferred method, a picture is first prepared showing the stationary elements of a series of pictures and having the field of the movable elements masked. This picture may be prepared by hand, drawing in the representations of the several stationary elements and then blackening the field of the movable elements. This one picture of the stationary elements is subsequently employed for reproducing by photography the stationary elements of all of the pictures of a series in which those elements remain unchanged. Also, a series of pictures of the movable elements is made, each of these pictures showing the movable elements but each one showing those elements in positions changed slightly from the preceding picture to the extent necessary to convey the impression of motion when the pictures are reproduced in a motion picture projecting machine. On each of these pictures showing the movable elements, the field of the stationary elements is masked as by blackening it. A series of composite pictures is then taken, each picture consisting of a reproduction of the stationary elements made by photography from the picture of the stationary elements and a reproduction of the movable elements made by photography from one of the several pictures of the movable elements. To facilitate this, a support is preferably provided for holding a picture in the proper relation to a camera; the reproduction of the stationary elements is positioned upon this support and a photograph of it taken; then one of the pictures of the movable elements is so positioned upon the support as to register accurately with the position formerly occupied by the reproduction of the stationary elements, whereupon a second photograph is taken upon the same sensitized surface showing the reproduction of the movable elements. Thus, two exposures are made upon the same sensitized surface, the first causing the image of the stationary elements to be received upon the sensitized surface and the second causing the image of the movable elements to be received upon the sensitized surface. When photographing the picture of the stationary elements, the field of the movable elements upon the sensitized surface is unaffected because this field upon the reproduction of the stationary elements is masked, and similarly, when photographing the picture of the movable elements, the image of the stationary elements upon the sensitized surface is unaffected because the field of the stationary elements upon the reproduction of the movable elements has been masked. After each composite picture has been taken thus, the film in the camera is advanced and the representation of the stationary elements is again photographed; then the next of the series of pictures of the movable elements is mounted in position before the camera and a picture taken without advancing the film, so that superimposed images of the two pictures are received upon the same portion of the film in the camera.

I have found that the production of a series of pictures of the movable elements may be greatly facilitated by making use of a camera lucida, whereby when the first of the series of pictures has been prepared, it may be mounted in such a position that the camera lucida throws the image of the picture upon a sheet so supported that the image reflected thereon may be readily traced upon the sheet. In this way, the figures appearing upon the first picture may be readily reproduced upon the second as to all parts of the picture which are to remain unchanged in the next picture of the series and as to those parts which are to be changed, the necessary changes can be made more readily since the extent of the deviation from the preceding picture can be accurately gaged.

Preferably, the procedure is further simplified by providing a sheet separate from the picture of the moving elements for making the field of the stationary elements opaque while taking the picture of the moving elements. For this purpose, a black sheet having the field of the movable elements accurately cut therefrom may be employed, this being laid over the picture of the moving elements when photographing it. I prefer, however, to use a rectangular sheet of glass overlying the picture of the moving elements and having the portion of its surface corresponding to the field of the stationary elements blackened in any suitable manner.

In order that my improved process may be more readily understood, I have illustrated in the accompanying drawings apparatus which may be employed in the practice of the process. In these drawings, Figure 1 is a perspective view of a support for the pictures and a camera mounted over the support; Fig. 2 is an elevation of a portion of the apparatus shown in Fig. 1; Fig. 3 is a view of the picture showing the stationary elements of the series of pictures; Fig. 4 is a view of one of the pictures showing the movable elements; and Fig. 5 is a perspective view of the parts employed in supporting the pictures before the camera.

Referring to these drawings, a picture such as that shown in Fig. 3 is prepared by hand showing the elements which remain the same throughout the series of pictures and on this picture the field of the movable elements of the several pictures is masked. In Fig. 3, the stationary elements are shown as forming a border surrounding the field of the movable elements and representing a stage and a cannon near one corner of this stage. Fig. 4 shows one of the pictures of the movable elements and the overlying sheet by which the field of the stationary elements is masked. A number of pictures are prepared corresponding exactly to the picture shown in Fig. 4, except that throughout the series, the representation of the man or other moving person or object is slightly changed in successive pictures so as to represent the movements made by the man. In addition to the one picture shown in Fig. 3 and the series of pictures represented in Fig. 4, a sheet is prepared which may be used with each of the latter pictures to mask the field of the stationary elements when photographing a picture of the moving elements. This may be a sheet of paper having the field of the stationary elements cut out and having its surface blackened. However, I prefer to use a rectangular sheet of glass blackened over the area corresponding to the field of the stationary elements. Such a sheet is shown in Fig. 4 overlying a rectangular sheet of paper on which only the picture of the man is drawn.

Fig. 1 shows a support 6 upon which the pictures are mounted and above this a moving picture camera 7 provided with a crank 8 by which the film in the camera may be advanced step by step as desired. The shutter 9 of the camera may be operated in any suitable manner, as for instance, by the bulb shown at 10 in Fig. 2.

In using the apparatus, the picture of the stationary elements, such as that shown in Fig. 3, is positioned on the support 6 and the shutter of the camera is operated so that the image of the picture is received upon the film of the camera. Then the picture shown in Fig. 4 with its overlying member for masking the field of the stationary elements is substituted for the picture shown in Fig. 3 and so positioned as to obtain accurate registry; then, without advancing the film of the camera, the shutter of the camera is again operated. Thus two pictures are taken upon the same section of the film of the camera, one of the elements shown in Fig. 3 and the other of the elements shown in Fig. 4. Then the film in the camera is advanced by turning the crank 8 and the picture shown in Fig. 3 is again brought into the field of the camera whereupon the shutter 9 is operated to effect another exposure. Then the next picture of the series of pictures of the movable elements is substituted for the one previously photographed and, without advancing the film in the camera, another exposure is made so that again two images are received upon the same section of the film. This procedure is repeated until photographic reproductions of all of the pictures of the movable elements are taken, the picture of the stationary elements being combined with each picture of the movable elements in the manner above described.

To facilitate the operation of taking the pictures and aid in securing accurate registration, the construction shown in Fig. 5 is preferably employed. This includes a frame consisting of side members 11, an end member 12 and a base plate 13 mounted upon the surface of the support 6. On the plate 13 are a plurality of springs 14 shown as consisting of strips of sheet-metal each secured at one end to the base and having the other end extending upwardly. This frame is adapted to receive a rectangular frame 15 for the picture of the stationary elements. This frame has a base board upon which the picture is received and which is adapted to bear against the springs 14. The frame 15 is movable vertically and is guided in its movements by projections 16 which enter slots 17 provided in the end member 12 of the main frame. The sides of the frame 15 for the picture of the stationary elements have their ends cut away to an incline as shown at 18. Another frame is provided for the pictures of the movable elements as shown at 19. The ends of the side members of this frame are inclined as shown at 20 and the frame is adapted to slide back and forth on the main frame with its side members bearing upon ledges provided upon the side members 11 of the main frame. In addition to these parts, a rectangular border plate is provided, as shown at 23, having guide-strips 24 at its lateral edges adapted to co-act with under-cut strips 25 secured to the outer sides of the side members 11 of the main frame.

With the parts thus constructed, the picture of the stationary elements is mounted in the frame 15, preferably with a sheet of glass over it and the frame is placed in the main frame where it is moved downwardly against the tension of springs 14 sufficient to permit the border plate 23 to be moved along on the guides 24 to the proper position over the picture. With the several parts thus positioned, the shutter of the camera is operated to effect an exposure. Also, the first picture of the series of pictures of the moving elements is placed on the frame 19 and over it is placed the sheet of glass having the field of the stationary elements thereon blackened, the frame 19 being then displaced laterally from the frame 15. This having been done, the frame 19 is moved along in the side members 11 of the main frame and the inclined ends 20 of frame 19 engage the inclined ends 18 of frame 15, thereby depressing the frame 15 against the tension of springs 14. The frame 19 passes under the border plate 23 and when its lateral movement is arrested by the engagement of the end of the frame with the end wall 12 of the main frame, the picture in the frame 19 is in the position of accurate registry and the second exposure may then be made by operation of the shutter 9. The frame 19 is then moved back to its initial position whereupon the frame 15 is raised by springs 14 to the proper position for taking the next photograph. Before again photographing the picture of the stationary elements, however, the film in the camera is advanced by turning the crank 8. After the picture of the stationary elements has been again photographed, the next picture of the series of pictures of the moving elements is substituted upon the frame 19 for the one previously photographed and moved back to the registering position as above described.

It will thus be seen that the film in the camera receives a succession of composite images each consisting of a reproduction of the elements shown upon the picture reproduced in Fig. 3 and a reproduction of the elements shown in one of the series of pictures indicated in Fig. 4, and that in taking the two pictures upon the same sensitized surface neither will affect the other because the field of the elements of each is masked when photographing the other. The drawing of pictures for use in making the film involves the production of only one picture of the elements which remain unchanged as to their positions throughout the series of pictures on the film and in making the pictures of the elements which change in successive views, the work of reproducing throughout this series of pictures those elements which remain fixed as to their positions is avoided. Only the representations of the figures which change in successive pictures have to be made individually and one sheet of glass or other suitable material must be prepared for use in darkening the field of the stationary elements when photographing the pictures of the moving elements. The difficult and time-consuming portion of the work of making films representing imaginary scenes and objects is therefore greatly simplified so that the time and expense involved are materially reduced.

As all photographers will understand, the masking may be effected by blackening the desired portions of the field, or by giving them any color such that the light reflected from them will not affect the sensitized film—for example, red.

What I claim is:

1. The process of making motion picture films consisting in preparing a representation of the stationary elements of a series of pictures, preparing a representation of the moving elements and taking superposed photographs of the two representations successively upon the same sensitized surface; substantially as described.

2. The process of making motion picture films consisting in preparing a representation of the stationary elements of a series of pictures, preparing a series of representations of the moving elements showing those elements in successive positions and taking a series of photographs of the representation of the stationary elements and one of the several representations of the moving elements in superposed relation; substantially as described.

3. The process of making motion picture films consisting in preparing a representation of the stationary elements of a series of pictures, preparing a series of representations of the moving elements showing those elements in successive positions and taking a series of photographs each of which is made by photographing successively the representation of the stationary elements and one of the several representations of the moving elements in superposed relation; substantially as described.

4. The process of making motion picture films consisting in preparing a representation of the stationary elements of a series of pictures having the field of the moving elements masked, preparing a series of representations of the moving elements showing those elements in successive positions and having the field of the stationary elements masked, and taking a series of photographs of the representation of the stationary elements and one of the several representations of the moving elements in superposed relation; substantially as described.

5. The process of making motion picture films consisting in preparing a representation of the stationary elements of a series of pictures having the field of the moving elements masked, preparing a series of representations of the moving elements showing those elements in successive positions and having the field of the stationary elements masked, and taking a series of photographs each of which is made by photographing successively the representation of the stationary elements and one of the several representations of the moving elements in superposed relation with the masked field of one registering with the unmasked field of the other; substantially as described.

6. The process of making motion picture films consisting in preparing a representation of the stationary elements of a series of pictures, preparing a series of representations of the moving elements in successive positions, preparing a masking member corresponding in shape to the field of the stationary elements, and taking superposed photographs of the representation of the stationary elements and successive representations of the moving elements with said member positioned upon each of the representations of the moving elements; substantially as described.

7. The process of making motion picture films consisting in preparing a representation of the stationary elements of a series of pictures, preparing a series of representations of the moving elements showing those elements in successive positions, preparing a masking member corresponding in shape to the field of the stationary elements and taking a series of photographs of the representation of the stationary elements and one of the several representations of the moving elements in superposed relation with said member positioned upon each of the representations of the moving elements when photographing the latter; substantially as described.

8. The process of making motion picture films consisting in preparing a representation of the stationary elements of a series of pictures, preparing a series of representations of the moving elements showing those elements in successive positions, preparing a masking member corresponding in shape to the field of the stationary elements and taking a series of photographs, each of which is made upon the same sensitized surface, of the representation of the stationary elements and one of the several representations of the moving elements with said member positioned thereon; substantially as described.

9. The process of making motion picture films consisting in preparing a representation of the stationary elements of a series of pictures, preparing a series of representations of the moving elements showing those elements in successive positions, and photographing upon a sensitized strip alternately the representation of the stationary elements and successive representations of the moving elements; substantially as described.

10. The process of making motion picture films consisting in preparing a representation of the stationary elements of a series of pictures having the field of the moving elements masked, preparing a series of representations of the moving elements showing those elements in successive positions and having the field of the stationary elements masked, and taking a series of photographs alternately of the representation of the stationary elements and successive representations of the moving elements; substantially as described.

11. The process of making motion picture films consisting in preparing a representation of the stationary elements of a series of pictures, preparing a series of representations of the moving elements in successive positions, preparing a masking member corresponding in shape to the field of the stationary elements and photographing upon a sensitized strip alternately the representation of the stationary elements and successive representations of the moving elements with said member positioned upon each of the representations of the moving elements; substantially as described.

In testimony whereof I affix my signature.

PAUL H. TERRY.